Patented Aug. 30, 1938

2,128,700

UNITED STATES PATENT OFFICE 2,128,700

AMMONOLYSIS OF NITRO-PHENOLS

Robert Frye and Nils H. Vagenius, Chicago, Ill., assignors to The Sherwin-Williams Company, Cleveland, Ohio, a corporation of Ohio No Drawing. Application July 24, 1936, Serial No. 92,450

8 Claims. (Cl. 260—581)

The present invention relates to chemical reactions for the replacement of a phenolic group by an amino group, when there is also present a nitro group.

In the field of aromatic chemistry it is known that a phenolic group may be replaced by an amino group in the simple procedure of ammonolysis, involving the use of excess of aqueous ammonia, usually at high heat and pressure in an autoclave. There are of course compounds which are not subject to this general reaction to produce high yields and purity suitable for commercial uses. One of these is the case where a nitro group is present as well as phenolic groups, as in the nitrophenols and the nitro cresols, in which the nitro group is in the ortho or para position to the phenolic group. When such nitrophenols are heated in an autoclave at 150° C. to 170° C. with excess ammonia for several hours, there is a replacement of the phenolic group by an amino group, but at the same time there is excessive formation of carbon, which lowers the yield and contaminates the product. The carbonization reaction appears to predominate, and the product is of little value. Hence this reaction has not been used heretofore in such cases.

The object of the present invention is to minimize the carbonization when treating benzene derivatives having nitro groups and hydroxyl or phenolic groups in the ortho or para relationship.

A particular object is to add an agent which minimizes the carbonization and produces satisfactory yields of amine.

The present invention is founded upon a discovery that agents can be found which are effective in the desired manner. It has been found that formic acid in the form of a salt, such as of sodium, potassium or ammonium, is effective to minimize carbonization. It has been used in quantities of one mole for each mole of the nitrophenol employed. The exact nature of its action has not been ascertained. But it is known that it is not effective because of its general classification as a reducing agent, for the reason that sodium bisulphite or sodium sulphite, also a reducing agent, is not likewise effective.

In carrying out the process one mole of an ortho or para-nitrophenol such as meta nitro para cresol, or other compound of the general formula $C_6H_4NO_2.OH$ or $CH_3.C_6H_3.NO_2.OH$ or higher homologs or other derivatives, is heated at 150° C. to 160° C. with 8 to 10 moles of 28% ammonia, in an autoclave for from 5 to 7 hours, using also one mole of formic acid as acid, or as a salt. If acid is used it will of course form the ammonium salt. An excellent yield results with little carbon. For example, where meta nitro para cresol is so used, a like run using no formate salt, produces a high degree of carbonization, and only a trace of meta nitro para toluidine.

The use of formate salt has not been characterized to date by complete prevention of carbonization. The carbon formed, however, is not sufficient to contaminate the product so that it cannot be used as a dyestuff intermediate, and the yields of the amine are such as to make the process attractive for the preparation of nitroamines from nitrophenols. This avoids resort to more complicated and expensive procedures to produce the amines, and it also gives a valuable outlet for converting nitrophenols into more useful materials.

The quantity of protective agent having the characteristics of formic acid salts, may be varied, but the equi-molecular quantity appears to be satisfactory.

The ammonolysis reaction is of course subject to variation in time and temperature to produce the most beneficial results as is well known by those skilled in the art.

We claim:

1. The method of making meta-nitro-para-toluidine which comprises subjecting a molar portion meta nitro para cresol to the action of more than one molar portion of ammonia in aqueous form in an autoclave at about 150° C. to 160° C. for 5 to 7 hours in the presence of a molar portion of a salt selected from the group consisting of alkali metal formates and ammonium formate.

2. The method of making meta-nitro-para-toluidine which comprises subjecting a molar portion meta nitro para cresol to the action of more than one molar portion of ammonia in aqueous form in the presence of a molar portion of a salt selected from the group consisting of alkali metal formates and ammonium formate.

3. The method of making meta-nitro-para-toluidine which comprises subjecting a molar portion meta nitro para cresol to the action of more than one molar portion of ammonia in aqueous form in the presence of a sufficient quantity of a salt selected from the group consisting of alkali metal formates and ammonium formate to minimize carbonization.

4. In an ammonolysis reaction to substitute a hydroxyl group by an amino group when there is a nitro group in non-meta position to the hydroxyl group, the step of adding a salt for minimizing carbonization selected from the group consisting of alkali metal formates and ammonium formate.

5. The method of treating a phenol having a nitro group in the nucleus which is not in meta position to the hydroxyl group, which comprises subjecting said nitrophenol to the action of aqueous ammonia to replace the hydroxyl group by an amino group, in the presence of a salt selected from the group consisting of alkali metal formates and ammonium formate, whereby to minimize formation of carbon.

6. The method of treating a phenol having a nitro group in the nucleus which is not in meta position to the hydroxyl group, which comprises subjecting a molar quantity of said nitrophenol to the action of aqueous ammonia to replace the hydroxyl group by an amino group, in the presence of a molar quantity of a salt selected from the group consisting of alkali metal formates and ammonium formate, whereby to minimize formation of carbon.

7. The method of making nitraniline which comprises subjecting a molar portion of nitrophenol selected from the group consisting of ortho-nitrophenol and para-nitrophenol to the action of more than one molar portion of ammonia in aqueous form to replace the hydroxyl group by an amino group in the presence of a molar portion of a salt selected from the group consisting of alkali metal formates and ammonium formate.

8. The method of making nitraniline which comprises subjecting a molar portion of nitrophenol selected from the group consisting of ortho-nitrophenol and para-nitrophenol to the action of more than one molar portion of ammonia in aqueous form to replace the hydroxyl group by an amino group in the presence of a sufficient quantity of a salt selected from the group consisting of alkali metal formates and ammonium formate to minimize carbonization.

ROBERT FRYE.
NILS H. VAGENIUS.